United States Patent [19]

Klomp

[11] 4,096,995
[45] Jun. 27, 1978

[54] VARIABLE SPRAY DIRECTION FUEL INJECTION NOZZLE

[75] Inventor: Edward D. Klomp, Mt. Clemens, Mich.

[73] Assignee: General Motors Corporation, Detroit, Mich.

[21] Appl. No.: 788,989

[22] Filed: Apr. 19, 1977

[51] Int. Cl.$^2$ .............................................. F02M 47/00
[52] U.S. Cl. .............................. 239/94; 123/140 FG; 239/533.8; 239/533.9
[58] Field of Search ............ 239/93, 94, 533.3–533.15, 239/570; 123/32 AE, 140 FG, 139 E

[56] References Cited

U.S. PATENT DOCUMENTS 2,003,814  6/1935  Taylor ................................ 239/533.7

Primary Examiner—Evon C. Blunk
Assistant Examiner—Andres Kashnikow
Attorney, Agent, or Firm—Arthur N. Krein

[57] ABSTRACT

A variable spray direction fuel injection nozzle includes a cylindrical nozzle body having a stepped bore therein defining at one end a first cavity and a second cavity of reduced size terminating at a closed end wall at the opposite end of the nozzle body, the nozzle body further having a fuel inlet in communication with the first cavity, the wall of the nozzle body being provided with a radial through spray orifice extending into the second cavity closely adjacent to the end wall, a cup-shaped, cylindrical valve open at one end being slidably mounted within the second cavity with its open end opening into the first cavity, the valve adjacent to its closed end being provided with a radially extending through slot, the valve being angularly fixed relative to the nozzle body so that the slot in the valve is in angular alignment with the spray orifice in the nozzle body, a spring being positioned within the nozzle body to normally bias the valve in an axial direction relative to the nozzle body whereby the slot in the valve is out of registry with the spray orifice in the nozzle body, but when the pressure of fuel supplied to the first cavity of the nozzle body acting on the valve is sufficient to overcome the biasing action of the spring, the valve will be moved axially within the nozzle body to bring the slot in the valve into registry with the spray orifice in the nozzle body whereby fuel can be discharged out through the spray orifice, a fuel bleed passage opening at one end into the second cavity being provided to control the egress of fuel from a chamber defined in this cavity between the end wall of the nozzle body and the closed end of the valve.

4 Claims, 5 Drawing Figures

U.S. Patent
June 27, 1978
4,096,995
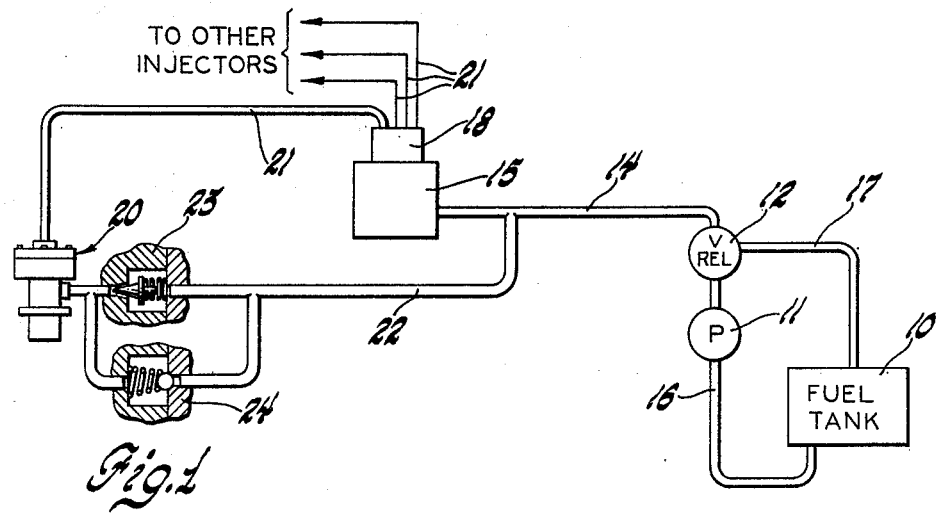
Fig. 1
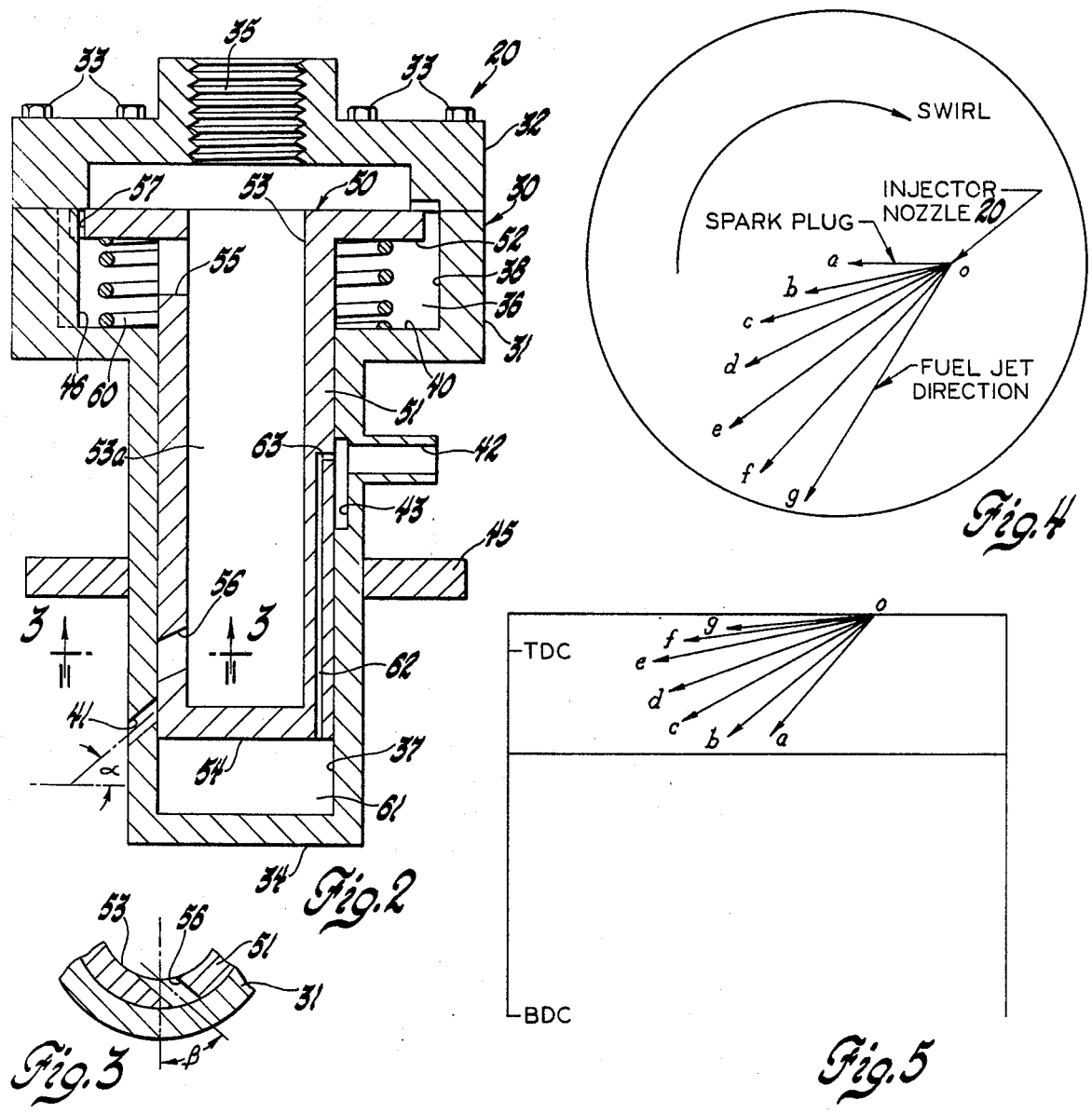
Fig. 2
Fig. 3
Fig. 4
Fig. 5

VARIABLE SPRAY DIRECTION FUEL INJECTION NOZZLE

This invention relates to a device for injecting fuel into the cylinder of an internal combustion engine, preferably an engine of the stratified charge type and, in particular, to a fuel injection nozzle for direct injection of fuel in a variable spray pattern into the cylinder of such an engine.

Fuel injectors or fuel injector nozzles, whether used as part of a unit injector or as part of a pump and nozzle system, are normally of the needle valve controlled type that includes a nozzle body having a spray tip at one end thereof with one or more spray orifices therein in communication with an axial passage in the nozzle body supplied with fuel under pressure, flow of fuel through the passage to the spray orifices being controlled by a needle valve having a seat at one end thereof adapted to cooperate with a seat in the nozzle body upstream of the spray orifices, the needle valve being normally biased to a closed position by a closing spring. Normally, in such injection nozzles, the ratio of the diamter to the length of each orifice is such that the spray pattern of fuel discharged from each orifice depends completely upon the flow path through each orifice with the spray pattern thus being determined by the number and locations of the spray orifices.

It is also well known in the art of fuel injection that such a needle valve, upon both opening and closing, will have an effective flow area therepast less than that of the spray orifices. This causes the very first fuel and the very last fuel injected to be poorly atomized and causes dribble. In addition, in these prior art needle valve type injectors or nozzles, the force of the closing spring must be sufficient to effect seating of the needle valve against cylinder pressure which acts to hold the needle valve open.

It is therefore a primary object of this invention to improve a fuel injection nozzle whereby the fuel spray pattern discharged from the nozzle can be varied, the fuel flow passage from the nozzle having a first flow path direction as provided by a radial slot in a valve plunger and a second flow path direction attributed to a radial spray orifice in the nozzle body, fuel being injected as the slot comes into registry with the spray orifice.

Another object of this invention is to improve an injection nozzle for use in a stratified charge engine whereby the fuel discharge is controlled by a cup-shaped plunger having a slot therethrough, the plunger valve being moved axially in a nozzle body to effect registry of the slot in the plunger valve with a radial spray orifice in the nozzle body.

A still further object of this invention is to provide an improved fuel injection nozzle of the type wherein the fuel delivery is controlled by a cup-shaped plunger valve operable in a nozzle body in response to a predetermined fuel supply pressure to effect alignment of a discharge slot in the valve with a spray orifice in the nozzle body.

A further object of this invention is to provide an improved fuel injection nozzle that is of simple, but rugged construction, that can have the spray slot in the plunger valve and the spray orifice in the nozzle body of the assembly, which cooperate with each other for the discharge of fuel, designed so as to obtain any desired variable spray pattern of the fuel discharged from the nozzle.

These and other objects of the invention are obtained by a fuel injection nozzle having a nozzle body with a stepped bore therein terminating at a closed end wall, the bore providing a first cavity at one end of the nozzle body with a fuel inlet in the nozzle body extending to the first cavity and a second cavity terminating at the closed end wall, with an intervening shoulder between the first cavity and the second cavity. Adjacent its closed end, the nozzle body is provided with at least one radial through spray orifice extending into the second cavity at a predetermined angle relative to the axis of the cavity and with a fuel bleed passage opening into an axial extending bleed groove in the peripheral wall of the nozzle body defining the second cavity, the bleed groove being axially spaced a predetermined distance from the spray orifice. A cup-shaped plunger valve is reciprocally journaled in the second bore with its open end opening into the first cavity whereby to be in fluid communication with the fuel inlet into the nozzle body. The plunger valve is provided adjacent to its closed end with at least one orifice slot extending through the peripheral wall thereof and it is further provided with an axial fuel bleed passage extending from the closed end to be in communication with a radial port that is normally in communication with the bleed groove in the nozzle body. A spring is positioned in the nozzle body to normally bias the plunger valve in an axial direction whereby the orifice slot in the plunger valve is out of registry with the spray orifice in the nozzle body. When fuel at the predetermined pressure is delivered to the nozzle assembly via the inlet in the nozzle body, it will act against the biasing action of the spring to move the plunger valve in an axial direction so as to bring the slot orifices in the plunger valve into registry with the spray orifice in the nozzle body to permit the discharge of fuel from the injection nozzle. Fuel in the chamber between the closed end of the plunger valve and the closed end of the nozzle body is discharged therefrom through the bleed passage and out through the bleed outlet in the nozzle body. Preferably, valve means are used to control the flow of fuel through the bleed passage arrangement, the pressure of fuel in the fuel bleed passages being, of course, less than the pressure of fuel used to effect injection.

For a better understanding of the invention, as well as other objects and further features thereof, reference is had to the following detailed description of the invention to be read in connection with the accompanying drawings, wherein:

FIG. 1 is a schematic illustration of a fuel system for use in supplying fuel, for example, to a stratified charge engine, the system utilizing fuel injection nozzles in accordance with the invention;

FIG. 2 is a longitudinal, sectional view through a fuel injector nozzle in accordance with the invention;

FIG. 3 is a sectional view taken along line 3—3 of FIG. 2 to illustrate the angular relationship of the orifice slot in the plunger valve of the fuel injection nozzle of FIG. 2;

FIG. 4 is a schematic top view of the cylinder of a stratified charge engine to illustrate the location of the spark plug and injection nozzle for the cylinder and to illustrate the type spray pattern that can be obtained with the fuel injection nozzle of the invention; and, FIG. 5 is a schematic longitudinal view of the cylinder of FIG. 4 to show the axial components of the spray pattern obtained with the fuel injection nozzle of the invention.

Referring first to FIG. 1, there is shown schematically the fuel supply system for an internal combustion engine, such as a four-cylinder, direct injection, stratified charge engine. As shown, fuel from a fuel tank 10 is supplied by a low pressure supply pump 11 via a pressure relief valve 12 and conduit 14 to the inlet passage of a conventional high pressure fuel pump, generally designated 15. As shown, the inlet of the supply pump 11 is connected by a fuel conduit 16 to the fuel tank while a return conduit 17 is interconnected between the relief valve 12 and the fuel tank 10. The high pressure fuel pump 15 discharges fuel to a fuel distributor 18 which controls the flow of high pressure fluid to a plurality of fuel injection nozzles, generally designated 20, via a plurality of conduits 21, only one fuel injection nozzle, in accordance with the invention, being shown in FIG. 1. In the arrangement shown in FIG. 1, the distributor 18 is provided with four outlets corresponding to the four cylinders of the engine, not shown, it being realized that if the system was used for an engine with more or less cylinders, the distributor would have the corresponding number of outlets whereby to supply fuel to each cylinder. The high pressure pump 15 and the distributor 18 can be of any conventional construction and could be combined into a unitary fuel pump and distributor structure, as is well known in the art.

Each injection nozzle 20 has a low pressure fuel bleed passage connected via a conduit 21 to a suitable, relatively low pressure control fuel accumulator, for a purpose to be described. In the construction shown in FIG. 1, this pressure control fuel accumulator is, in effect, the portion of the conduit 14 between the discharge side of the supply pump 11 downstream of relief valve 12 and the inlet side of the fuel pump 15. Preferably, a variable one-way valve 23 is interconnected in the fuel line 22 to provide for variable restricted bleed fuel flow from the fuel injection nozzle 20 to the accumulator. Preferably, as shown, a second one-way valve 24 is connected in parallel to the bleed valve 23 whereby for certain operating conditions, as will be described hereinafter, fuel from the accumulator can flow to the fuel injection nozzle.

Referring now to the fuel injection nozzle 20 of the invention, as shown in FIG. 2, it includes a nozzle body 30, which in the construction illustrated consists of a lower nozzle body 31 and an upper nozzle body 32 suitably secured together, as by machine screws 33. As shown, the nozzle body of cylindrical configuration is provided with a stepped bore extending from its upper end, in reference to FIG. 2, to terminate at a closed lower end wall 34 of the lower nozzle body 31.

The stepped bore in the nozzle provides an inlet passage 35, which may be provided, as shown, with internal threads to effect suitable threaded connection to the conduit 21, the inlet 35 opening into an annular stepped cavity or chamber 36 formed, in part, in both the upper and lower nozzle bodies 32 and 31. respectively, this cavity or chamber 36, in turn, being in communication with a cylindrical cavity of smaller diameter, as defined by the annular inner peripheral wall 37 in the lower nozzle body 31, the wall 37 terminating at the end wall 34. As shown, the upper cavity or chamber 36 is defined in part by an annular inner wall 38, within the lower nozzle body 31, which is interconnected to the annular wall 37 by a radial shoulder 40. Adjacent to the lower end wall 34, the outer peripheral wall of the lower nozzle body, is provided with a through aperture or slot to define a radial discharge port or spray orifice 41 which, in the embodiment shown, is inclined at an angle to the vertical axis of the nozzle body, for a purpose to be described. The lower nozzle body 31 is also provided intermediate its ends with a radial bleed port or passage 42 connectable at one end to the fuel line 22 and in communication at its other end with an axial extending, arcuate bleed slot 43, of predetermined length, that is provided in the annular inner wall 37 for a purpose to be described, the bleed slot 43 being located a predetermined axial distance from the spray orifice 41.

The nozzle body 30 is also provided with suitable means, such as annular radial flange 45 on the lower nozzle body 31 whereby it can be mounted to the cylinder head of the engine so that the spray orifice 41 is positioned to discharge fuel into the cylinder, not shown, with which it is associated.

A cylindrical cup-shaped plunger valve, generally designated 50, which is open at one end and closed at the other end, is movably positioned within the nozzle body and includes a lower cylindrical portion 51, having an outer peripheral surface of a diameter to be closely slidable within the annular inner wall 37 of the nozzle body and, an upper annular radial flange 51 loosely received within the cavity or chamber 36. As shown, the plunger valve 50 is provided with a bore opening, extending from one end thereof, the upper or flange 52 end, defining an annular inner wall 53 that terminates at the closed disk-shaped lower end wall 54 of the plunger valve, the inner wall 53 and end wall 54 defining a fuel chamber 53a that is in communication with chamber 36 and inlet 35. To further effect fluid communication between the chamber 36 and the interior of the plunger valve 50 and to enhance fluid communication to the chamber 36 on the lower side of flange 52, the lower cylindrical portion 51 thereof, in the construction shown, is provided with at least one radial through port or aperture 55 in the peripheral wall thereof next adjacent to the flange 52, it being apparent that other suitable means may be provided to effect such fluid communication.

The lower cylindrical portion 51 of the plunger valve 50 is provided with a through aperture to define a radial discharge slot 56 located a predetermined axial distance from the lower end wall, this slot 56 providing a discharge passage for the fluid contained within the bore cavity of the plunger valve. In the assembled position of the plunger valve 50 within the nozzle body 30, the plunger valve is angularly located so that the slot 56 and, more specifically, the discharge end of this slot, next adjacent to the interior wall 37 of the lower nozzle body, will be aligned with the end of the spray orifice 41 as it extends through this inner wall 37, suitable cooperating means being provided on the plunger valve and the lower nozzle body to effect this alignment. In the construction illustrated, this angular relationship between the plunger valve and the lower nozzle body is maintained by means of an axial extending tongue 46 that is slidably received within a suitable groove 57 provided in the outer rim of the flange 52, it of course being realized that these elements could be reversed.

The plunger valve 50 is reciprocally journaled in the nozzle body for movement axially a predetermined distance therein and the axial location of the slot 56 and of the spray orifice 41 are selected so that, when the plunger valve is in its uppermost or closed position relative to the spray orifice 41, the position shown in FIG. 2, the slot 56 is out of registry with the spray orifice 41 and the outer peripheral wall of the plunger valve is in position to block flow through the spray orifice 41. The plunger valve 50 is axially movable within the nozzle body, in a downward direction with reference to FIG. 2, for a predetermined distance whereby, during downward movement of the plunger valve, the slot 56 will be advanced into registry with the spray orifice 41 whereby fuel within the bore cavity of the plunger valve can be discharged via the slot 56 and spray orifice 41 into the cylinder of an engine.

The plunger valve 50 is normally biased in an axial direction within the nozzle body to its upper position in the nozzle body, the position shown, by a spring 60 whereby the slot 56 in the plunger valve is normally out of registry with the spray orifice 41 in the nozzle body. The spring 60 loosely encircles the lower cylindrical portion 51 of the plunger valve with one end of the spring abutting against the radial shoulder 40 of the lower nozzle body 31 while the opposite end of the spring abuts against the lower surface of the flange 52, axial movement of the plunger valve in one direction, in its upper limit of travel as shown in FIG. 2, being limited by abutment of the upper surface of the flange 52 against the bottom surface of the upper nozzle body 32.

The plunger valve 50 is slidably positioned with the lower nozzle body 31 to form with the lower end of this nozzle body, a variable volume chamber, hereinafter referred to as bleed chamber 61. Fuel in the bleed chamber 61 is maintained at a relatively low pressure, relative to the injection pressure of fuel admitted into the nozzle assembly via inlet 35, by means of a suitable fuel bleed passage means provided to permit the discharge of fuel from the bleed chamber 61. In the construction illustrated, this is provided by an axial passage 62 in the peripheral wall of the plunger valve extending axially from the bottom thereof, that is, from the end wall 54, this passage 62 terminating at a radial port 63 that is axially positioned, relative to movement of the plunger valve, to be at all times in communication with the bleed slot 43 in the nozzle body and therefore in communication with the bleed passage 42.

As previously described, bleed passage 42 is provided to permit bleeding of fuel and, preferably, it is connected to a suitable, relatively low pressure control fuel accumulator. Thus, during operation, when fuel at high pressure is delivered to the fuel injection nozzle assembly via inlet 35, axial movement of the plunger valve 50 within the nozzle body 30, in a downward direction, with reference to FIG. 2, can occur since any fuel within the bleed chamber 61 will be at reduced pressure and this fuel can be discharged from chamber 61 via the bleed passage arrangement just described to permit continued axial movement of the plunger valve whereby the slot 56 can be moved into registry with the spray orifice 41 to effect the discharge of fuel from the fuel injection nozzle, as a function of inlet supply fuel pressure.

It will be apparent from the above description that the subject fuel injection nozzle has two main components, that is, the plunger valve 50 in the form of an inner cylinder slidably fitting closely inside an outer cylinder in the form of the lower nozzle body 31 of the device with each of these cylinders being slotted, that is, the plunger valve is provided with the slot 56 and the lower nozzle body 31 is provided with a slot or spray orifice 41, with the direction of these slots determining the general fuel spray jet direction.

In the construction shown, the spray orifice 41 is inclined at an angle to the axis of the stepped bore in the lower nozzle body 31 and the slot 56 in the plunger valve 50, also slightly inclined to the axis of the plunger valve, is circumferentially directed at an angle $\beta$, as seen in FIG. 3. In particular, in the construction illustrated, the angle $\alpha$ of the spray orifice 41, as shown in FIG. 2, in the nozzle body determines the axial component of the fluid jet stream discharged from the injection nozzle, and the angle $\beta$ of the slot 56 determines the circumferential direction of the discharge fuel spray pattern. The spray orifice 41, in the construction illustrated, is thus essentially a radial, axial inclined slot which may have any desired angle $\alpha$, while the slot 56 is essentially a helical slot which may be directed at any desired angle $\beta$. It will be readily apparent to those skilled in the art that these slots can be interchanged between the above-described inner and outer cylnders without altering the basic operation of the fuel injection nozzle or, if desired, they can be aligned in any way, as desired. In operation, as the plunger valve or inner cylinder moves downward within the nozzle body, the two slots, that is, the slot 56 and the spray orifice 41, will come into registry with each other and the direction of fluid flow from the injection nozzle is determined by the two slot angles and the time pulse duration of fuel injection, as explained more fully hereinafter.

Referring now to FIGS. 4 and 5, there is illustrated schematically the combustion chamber of a direct injection stratified charge engine, the combustion chamber being shown disk-shaped, but it is realized that its configuration could be any desired particular shape. Also, in this construction, there is shown a swirl vortex centered about the cylinder axis, this vortex flow being generated by an appropriately designed intake port and valve arrangement, in a manner known in the art. In the particular construction shown, both the spark plug for the combustion chamber and the fuel injection nozzle 20 are located off-center. The fuel spray pattern shown schematically in these figures is that produced by the single hole spray orifice in the above-described fuel injection nozzle 20. By providing the proper ratio of diameter to length for the slots, in particular for the spray orifice 41, the spray angle of the fuel discharged from the fuel injection nozzle will have both axial and circumferential components of direction and, as shown in FIGS. 4 and 5, depending on the time pulse duration of injection, the spray pattern coverage can extend from aob to aog. Thus, an engine load is increased, that is, as the time pulse for injection is increased, the spray coverage is progressively increased from angle aob to aog. The spray pattern shown will, of course, be deflected in a clockwise direction from that shown, due to the clockwise air swirl direction shown, with the amount of deflection being a function of the air swirl rate within the cylinder and decreasing with increased injection pressure. It will be apparent that the fuel jet penetration and angle of fuel spray will determine the maximum fuel seeding radius and that injection duration and swirl rate will determine the circumferential extent of seeding.

During operation, the slot 56 in the plunger valve is normally held out of registration with the spray orifice 41 by the spring 60 acting on the plunger valve to bias it to the position shown in FIG. 2. Depending on the engine system in which the fuel injection nozzle is used, at the desired time, the nozzle is supplied with high pressure fuel through the inlet 35 until a predetermined injection pressure is obtained in the chamber 36 so as to overcome the biasing action of spring 60 to effect movement of the plunger valve downward, with reference to FIG. 2. As previously described, the fuel in bleed chamber 61 is at a low pressure and is forced out the bleed passage means, previously described. The speed with which the plunger valve 50 moves is determined by the mechanical and fluid dynamics of the system. When the fuel pressure within the chamber 36 drops, the spring 60 will bias the plunger valve to its original closed position, relative to spray orifice 41.

Control over the rate of movement of the plunger valve 50 can be exercised by the use of an appropriate bleed valve in the bleed circuit. The objective of such a valve is to control the rate at which the spray direction changes by controlling the rate of fuel discharged from the bleed chamber 61. In the fuel system shown in FIG. 1, this bleed valve is the bleed valve 23, which is a conventional one-way, variable flow bleed valve having an axially positioned tapered pin cooperating with the bleed orifice, in the construction shown, to provide the variable bleed function. It should, however, be realized that orifice area variation to control bleed flow from the bleed chamber 61 may be accomplished by a variety of conventional means, that is, either mechanical or electronic means, which could be operated in response to engine speed or load signals or both, in a manner well known in the art. Although this bleed valve 23 is shown for the purpose of illustration only as spaced from the fuel injection nozzle 20 in the construction shown in FIG. 1, it should be realized that this bleed valve 23 and the one-way check valve 24, the purpose of which is to be described, should be positioned as close to the bleed chamber 61 as practical.

Referring now to the one-way check valve 24, as shown in FIG. 1, this type valve is preferably used in connection with the bleed chamber 61 so that low pressure fuel from the low pressure control fuel accumulator can be used to resupply the bleed chamber 61 with low pressure fuel to permit more rapid return of the plunger valve by the spring 60 to the position shown in FIG. 2 at the end of fuel injection cycle.

Although the subject fuel injection nozzle assembly has been shown and described as having only one slot 56 in the plunger valve 50 and only one spray orifice 41 in the nozzle body, it will be apparent to those skilled in the art that a plurality of slot and spray orifice pairs could be utilized, if desired, for a particular engine application. It will also be apparent that although, in the fuel system arrangement shown in FIG. 1, a single pump and fuel distributor arrangement has been used to supply fuel to a plurality of injection nozzles, the system could include an individual pump for each injection nozzle.

What is claimed is:

1. A variable spray direction fuel injection nozzle includes a hollow nozzle body having a bored cylindrical portion at one end thereof closed by an end wall of said nozzle body, said nozzle body having an inlet for pressurized fuel at its opposite end, a hollow plunger valve, closed at one end and open at its other end, reciprocably positioned in said bored cylinder for predetermined axial movement relative thereto with its open end positioned to receive pressurized fuel from said inlet and having its closed end forming with the closed end of said bored cylinder a low pressure fuel chamber, a radial port orifice in said nozzle body in communication with said bored cylinder a predetermined axial distance from said end wall, a radial slot extending through the peripheral wall of said valve and located a predetermined axial distance from its closed end whereby, during axial movement of said valve in said bored cylinder between a first position and a second position, said radial slot will be out of registry with said radial port orifice when said valve is in said first position and said radial slot will traverse said radial port orifice when said valve is in said second position, said nozzle body including first guide means and said valve including second guide means operatively associated with said first guide means to position said radial slot in axial alignment with said radial port orifice, spring means operatively associated with said nozzle body and with said valve to normally bias said valve in an axial direction to said first position so that said radial slot is out of registry with said radial port orifice and, fuel bleed passage means, including at least a fuel port in said nozzle body, in communication at one end with said low pressure fuel chamber and at its opposite end being operatively connectable to a low pressure fuel accumulator.

2. A variable spray direction fuel injection nozzle including a hollow nozzle body having a bored cylindrical portion, including an inlet, extending from one end thereof to terminate at a closed end wall, a hollow plunger valve open at one end and closed at its other end slidably positioned in said bored cylindrical portion of said nozzle body and axially movable therein between a first position and a second position, said plunger valve having its open end positioned to be in fluid communication with said inlet, said plunger valve at its closed end forming with the bored cylindrical portion and said closed end wall of said nozzle body a bleed chamber for fuel at reduced pressure, said valve body having a through first aperture in the wall thereof positioned a predetermined distance from said closed end wall and opening into said bored cylindrical portion, said plunger valve having a through second aperture in the peripheral wall thereof positioned a predetermined axial distance from the closed end of said plunger valve so that when said plunger valve is in said first position, said second aperture will be out of registry with said first aperture and when said plunger valve is in said second position, said second aperture will be in registry with said first aperture, valve guide means operatively associated with said plunger valve and with said nozzle body to effect axial alignment of said first aperture with said second aperture when said plunger valve is in said second position, spring means positioned in said nozzle body and operatively connected to said plunger valve to normally bias said plunger valve to said first position and, fuel bleed passage means, including at least a bleed passage in said valve body, in communication at one end with said low pressure fuel chamber and connectable at its other end to a fuel bleed return conduit.

3. A variable spray direction fuel injection nozzle including a hollow nozzle body having a bored cylindrical portion, including an inlet, extending from one end thereof to terminate at a closed end wall, a hollow plunger valve open at one end and closed at its other end slidably positioned in said bored cylindrical portion of said nozzle body and axially movable therein between a first position and a second position, said plunger valve having its open end positioned to be in fluid communication with said inlet, said plunger valve at its closed end forming with the bored cylindrical portion and said closed end wall of said nozzle body a bleed chamber for fuel at reduced pressure, said nozzle body having a through axially inclined radial aperture in the wall thereof positioned a predetermined distance from said end wall and opening into said bored cylindrical portion, said plunger valve having a through circumferential extending slot aperture in the peripheral wall thereof positioned a predetermined axial distance from the closed end of said plunger valve so that when said plunger valve is in said first position, said slot aperture will be out of registry with said radial aperture and when said plunger valve is in said second position, said slot aperture will be in registry with said radial aperture, first valve guide means in said plunger valve and second valve guide means in said nozzle body operatively associated with said first guide means to effect axial alignment of said radial aperture with said slot aperture when said plunger valve is in said second position, spring means positioned in said nozzle body and operatively connected to said plunger valve to normally bias said plunger valve to said first position and, fuel bleed passage means, including at least a bleed passage in said nozzle body, in communication at one end with said fuel chamber for the bleed of fuel from said fuel chamber.

4. A variable spray direction fuel injection nozzle includes a hollow nozzle body having at least a lower cylindrical portion with an annular cylindrical inner peripheral surface terminating at a closed end wall, said nozzle body at its opposite end being partly enclosed by an opposite end wall having an inlet for pressurized fuel therethrough, a hollow cylindrical valve, closed at one end and open at its other end mounted for reciprocation within said lower cylindrical portion of said nozzle body as reciprocally journaled by said inner peripheral wall for movement between a first position and a second position in said nozzle body, said valve having its open end in fluid communication with said inlet, said cylindrical portion of said nozzle body having at least one radial spray orifice extending therethrough with said spray orifice extending from said inner peripheral surface in an axial direction toward said end wall, said valve having a helical slot extending through the annular wall thereof and located a predetermined axial distance from said closed end of said valve, said nozzle body including a first axial extending guide means and said valve including a second guide means engageable with said first guide means whereby said helical slot theough said valve is positioned for flow alignment with said radial spray orifice in said valve body whereby during axial movement of said valve in one direction from said first position to said second position said helical slot will partly traverse across said spray orifice slot so that pressurized fuel in said valve can flow out through said helical slot and then through said radial spray orifice in a variable spray pattern, spring means operatively associated with said nozzle body and with said valve to normally bias said valve to said first position at which said helical slot is out of registry with said radial spray orifice, said closed end of said valve defining with said end wall and with a portion of said inner peripheral surface of said nozzle body intermediate said spray orifice slot and said end wall a low pressure fuel chamber and, fuel bleed passage means, including at least a radial port in said nozzle body, in communication at one end with said low pressure fuel chamber and at its said radial port end being operatively connectable to a low pressure fuel return line.

* * * * *